United States Patent [19]

Ananth et al.

[11] Patent Number: 5,299,082
[45] Date of Patent: Mar. 29, 1994

[54] ACTUATOR ASSEMBLY WITH COMPENSATED OUTER ARMS

[75] Inventors: Raiu S. Ananth; Robert J. Green, both of San Jose; Adolf L. Fick, Cupertino, all of Calif.

[73] Assignee: Maxtor Corporation, San Jose, Calif.

[21] Appl. No.: 974,130

[22] Filed: Nov. 10, 1992

[51] Int. Cl.[5] .......................... G11B 5/012; G11B 5/56
[52] U.S. Cl. .................................. 360/106; 360/98.03; 360/109
[58] Field of Search .............................. 360/104–106, 360/109, 97.03, 98.01–98.03

[56] References Cited

U.S. PATENT DOCUMENTS

| | | | |
|---|---|---|---|
| 5,208,712 | 5/1993 | Hatch et al. | 360/98.01 |
| 5,218,496 | 6/1993 | Kaczeus | 360/106 |
| 5,223,993 | 6/1993 | Squires et al. | 360/97.03 |
| 5,237,472 | 8/1993 | Morehouse et al. | 360/105 |

Primary Examiner—John H. Wolff
Attorney, Agent, or Firm—Blakely, Sokoloff, Taylor & Zafman

[57] ABSTRACT

An apparatus and method to compensate the outer actuator arms of a disk drive actuator assembly from an imbalanced moment to maintain a selected preload force. The present invention advantageously utilizes thin actuator arms to hold read/write head assemblies. During disk drive operation, the outer actuator arm receives an unbalanced outward moment originating from the flying read/write head associated with the outer actuator arm. This unbalanced outward moment is balanced by initially displacing the outer read/write heads inward so that they are not aligned straight. This special alignment creates an additional preload force which is decreased to a normal preload force when the outer actuator arm is returned to a straight alignment by said imbalanced moment. The present invention maintains a uniform preload value and therefore uniform read/write head flying height. In so doing, the outer actuator arms remain aligned during operation and the disk drive system of the present invention offers greater reliability.

39 Claims, 5 Drawing Sheets

FIG. 1

FIG_2

FIG_3

FIG_5

ACTUATOR ASSEMBLY WITH COMPENSATED OUTER ARMS

BACKGROUND OF THE INVENTION (1) Field of the Invention

The present invention relates to the field of disk drive technology. Specifically the present invention relates to design of outer arms of actuator assemblies of hard disk drives.

(2) Prior Art

Disk drive storage mediums, or "hard" disk drives, are mechanisms that store digital information on a spinning disk ("disc") or platter. The metallic platters are approximately from 3 inches in diameter up to 8 inches or more depending on the type of disk drive used or the storage capacity of the drive. Several platters arranged in parallel, one mounted on top of the next, rest in a drive case. Each platter is centrally fixed and carefully aligned in order to provide the spinning action required. A platter has two sides in which information can be stored. Also mounted to the drive case is an actuator arm which holds a read/write head associated with each platter side. If there are eight platters there could be up to 16 heads attached to the actuator arm.

The actuator arm assembly remains fixed with respect to the spinning platters but can move across the radius (position A to B) of the spinning platter in order to provide access to all of the surface area of the platter as the platter spins and as the actuator arm moves the read/write head across the platter diameter. Since the read/write head 22 remains in a fixed path and the platters spin, data is stored according to the arc of the heads across the platters, this is a circle. Therefore, magnetic data stored on a hard drive platter is stored in circular paths or sectors by the magnetic head passing across the magnetic surface. The rate that this information can be accessed or stored depends on the rate that the platters can spin. Conventional prior art disk drives can obtain a spin rate of approximately 3600 to 6400 revolutions per minute. The faster the spin rate, the faster information can be supplied by the drive and stored to the disk drive unit. The read/write heads associated with each platter fly above the platter surface on a cushion of air that is created by the air forces of the spinning platters. The heads ride very close to the platter surface so they can read and write magnetic information onto the platter surface. The characteristics of the air and the ski pads on the read/write heads dictate the attitude and movement of the flying read/write heads.

Figure 1:
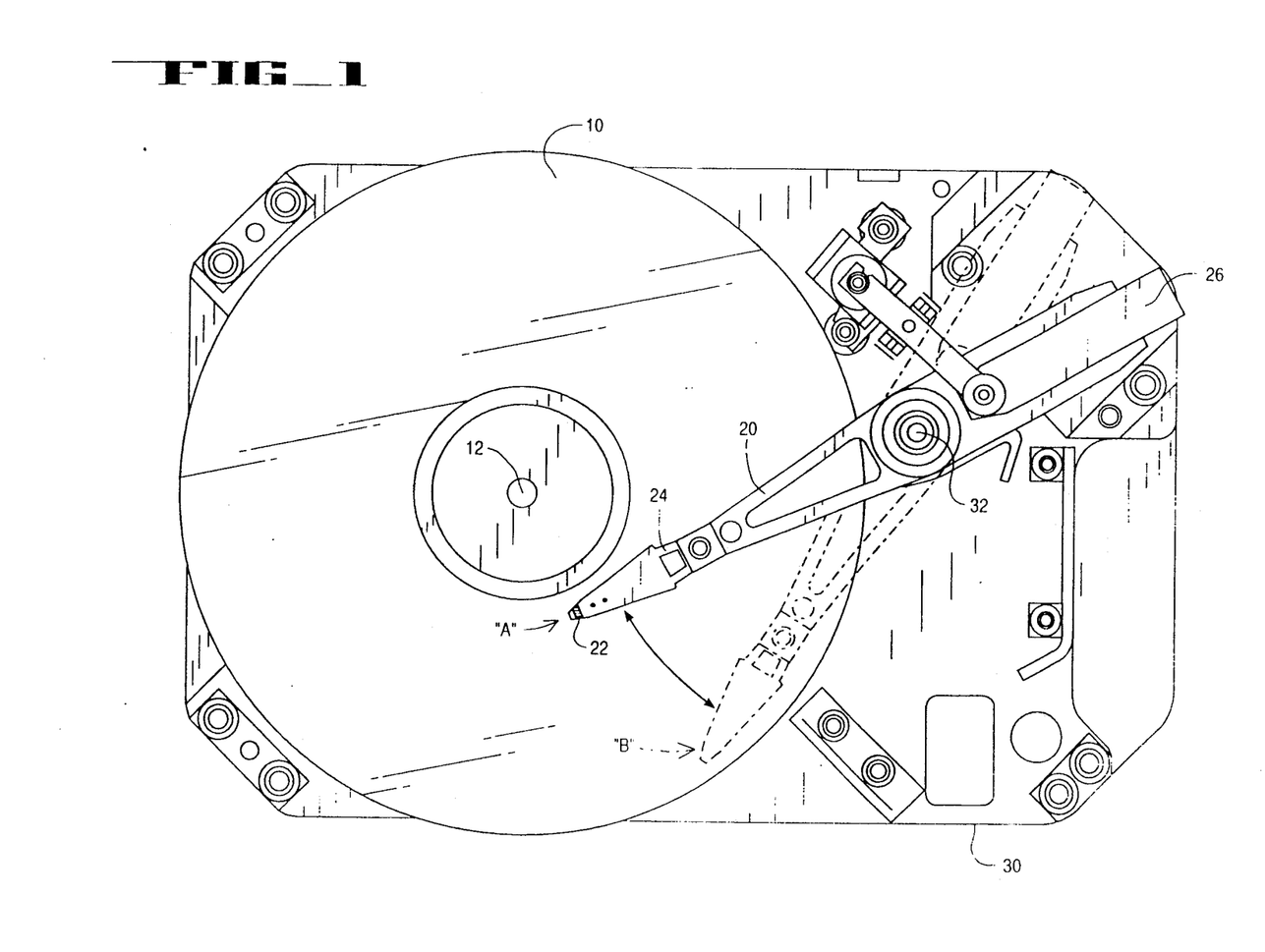
FIG. 1 is a top view of a disk drive system illustrating the position of the platters, the actuator assembly and various other disk drive mechanisms.

FIG. 1 illustrates a top view of a conventional disk drive system. The top surface of the top platter 10 is shown. The platters are spun by a spin motor. Each platter is centrally attached to the motor by the spin actuator 12. The arm assembly is shown as components 20, 22, 24 and 26. The arm assembly is also shown in FIG. 1 in two positions, an inner position "A" and an outer position "B". The arm assembly is made up of an actuator end 26 which is magnetically coupled for movement to pivot the assembly about pivot point 32. Pivot point 32 is coupled to the actuator arm section 20 which is also coupled to the head assembly 24 which holds the read/write head 22. The actuator end 26 is capable of moving the arm assembly from position A to B, thus the read/write head traverses the radius of the surface of platter 10. It is appreciated that the platter shown is but one platter in a parallel stack of platters. Another platter resides underneath the platter shown and another actuator arm, head assembly, and read/write head is associated with this platter. It is also appreciated that the bottom surface of platter 10 also bears information. Therefore, another actuator arm, head assembly, and read/write head is associated with the underside of platter 10. The entire system as described above is mounted to base 30.

The platters and actuator arm with associated heads are contained in a chamber within the disk drive unit. This chamber protects the platters and delicate movement required for the precise alignment of the platters to the actuator arm. Usually this chamber is sealed within a "clean room" having a reduced particle count so as to reduce the amount of dust and other particles that may become trapped especially between the platter and the read/write head within the drive case when the chamber is not sealed. These particles could render the disk drive inoperable if they were to become entrenched into the platters, read/write heads and other mechanisms.

Each read/write head associated with a platter of a disk drive is attached to a thin head assembly and an actuator arm. The head assemblies are manufactured and positioned so that each read/write head exerts pressure on a surface of the platter when assembled together and the disks are not in operation (i.e., spinning). The platters are aligned between each successive actuator arm, therefore one given actuator arm holds two read/writ heads and exerts pressure on a top surface of one platter but a bottom surface of another, adjacent, platter surface. The platter surfaces therefore exert pressure back on the actuator arm because the overall assembly remains static. For an actuator arm in between two platters, the forces exerted on the actuator arm from the platters are equal but in opposite direction and will balance each other to deliver a net zero force on the actuator arm. However, the actuator arms located on either end of the actuator assembly receive only one force exerted on them, either an upward or downward force depending on the side the actuator arm is located. In either case this force is outward, away from the actuator assembly. This imbalanced force, over time, may act to bring the actuator arm out of proper alignment and displace it outward.

In prior art disk drive systems, the top actuator arm receives an upward force from the head assembly which holds the top/read write head, but the top actuator arm receives no counter force from above since there are no platters above the top platter. This imbalance may act to bring the top actuator arm out of alignment or bend it away from its original position. Any movement out of alignment of the actuator arm will also move the read/write head out of its original path which will be fatal for the disk drive system and data failure and errors will result. In modern disk drive designs this problem becomes acute because the thickness of the actuator arms is decreasing as the disk drives become miniaturized. As the thickness of the actuator arms decreases the outer actuator arms become more susceptible to the force exerted by the associated read/write heads and therefore become more susceptible to movement out of alignment. It would be advantageous to be able to counter balance the outer actuator arms of disk drive actuator assemblies to prevent the failure condition described above in order to make the disk drives more reliable. The present invention offers such a solution.

In prior art systems the actuator arms are fairly thick, about 35 mils thickness. However, the present invention advantageously utilizes thin actuator arms, about 25 mils, which become very susceptible to these imbalanced forces from the flying read/write heads. The present invention utilizes thin actuator arms because the present invention operates in a reduced size hard disk drive where the components are advantageously reduced to conserve size and increase efficiency. The present invention offers a solution to the imbalanced forces using advantageously thin actuator arms and a force compensation apparatus and method.

The pressure exerted on the read/write heads by the head assembly (when the platters are at rest) is called the preload force. When the platters spin, an air bearing force lifts the read/write heads up off of the platter surface and they fly above the rotating surface. The preload force determines the height at which the read/write heads will fly. Any deviation of an outer actuator arm from its alignment position, as a result of the force imbalance of the above discussion, will change the preload value of the associated read/write head. This in turn changes the height at which the read/write head flies above the platter surface. If this height changes then data errors or a total failure will occur because the data on the disk platter is written in and read back by the read/write heads with respect to a predetermined flying height. In prior art systems any significant deviation of the outer actuator arms will cause the disk drive to fail. It would be advantageous to provide an arrangement that would maintain the alignment of the outer actuator arms so that the preload value of the associated read/write heads remains constant. This would then maintain the height of the read/write head above the platter surface when the disk drive was in operation. The present invention offers such a solution.

Therefore, it is an object of the present invention to maintain the alignment of the outer actuator arms of a disk drive by employing a compensation force on these outer arms that will maintain the preload force on the read/write heads associated with these outer arms. It is an object of the present invention to maintain the preload force on the read/write heads to maintain uniform flying height of the read/write heads above the platter surfaces. It is an object of the present invention to utilize the above alignment technique with actuator assemblies having thin actuator arms.

SUMMARY OF THE INVENTION

The present invention includes a method and apparatus for compensating for imbalanced moments exerted on outer actuator arms to maintain a preload value uniform throughout all of the actuator arms. The present invention includes an apparatus for compensating for imbalanced moment forces of an actuator assembly of a disk drive to maintain preload forces, the disk drive having platters, the apparatus comprising: an actuator assembly means for providing coupling locations; a plurality of read/write head assemblies coupled against the platters, each of the read/write head assemblies comprising a read/write head; a plurality of inner actuator arms coupled to the actuator assembly means and each of the plurality of inner actuator arms also coupled to two of the plurality of read/write head assemblies, the inner actuator arms each displaced straight; outer actuator arms coupled to the actuator assembly means and each of the outer actuator arms coupled to an associated one of the plurality of read/write head assemblies, the outer actuator arms each displaced inward; a first preload force exerted against the platters and associated with the outer actuator arms; and a second preload force exerted against the platters and associated with the inner actuator arms.

The present invention further includes, the apparatus as discussed above wherein the associated one of the plurality of read/write heads exerts an imbalanced moment upon an associated outer actuator arm to displace the associated outer actuator arm straight, and wherein the first preload force is greater than the second preload force when the outer actuator arms are aligned inward and wherein the first preload force is equal to the second preload force when the outer actuator arm is aligned straight; and the first preload force and the second preload force determines flying height of the read/write heads.

DETAILED DESCRIPTION OF THE INVENTION

The present invention includes an apparatus and method for maintaining the flying height of read/write heads located on the actuator arms located on the outer positions of the actuator assembly. The present invention adjusts the alignment of the outer actuator arms to compensate for the imbalanced moment forces generated by each flying read/write head associated with the outer actuator arms. By using this special alignment, the outer actuator arms become balanced enough to maintain the preload value of each read/write head. By maintaining the preload value of each read/write head, the flying height of the read/write head located on the outer actuator arms remains constant and the disk drive system maintains high reliability.

In the following detailed description of the present invention numerous specific details are set forth in order to provide a thorough understanding of the present invention. However, it will be obvious to one skilled in the art that the present invention may be practiced without these specific details. In other instances well known methods have not been described in detail as not to unnecessarily obscure the present invention.

Figure 2:
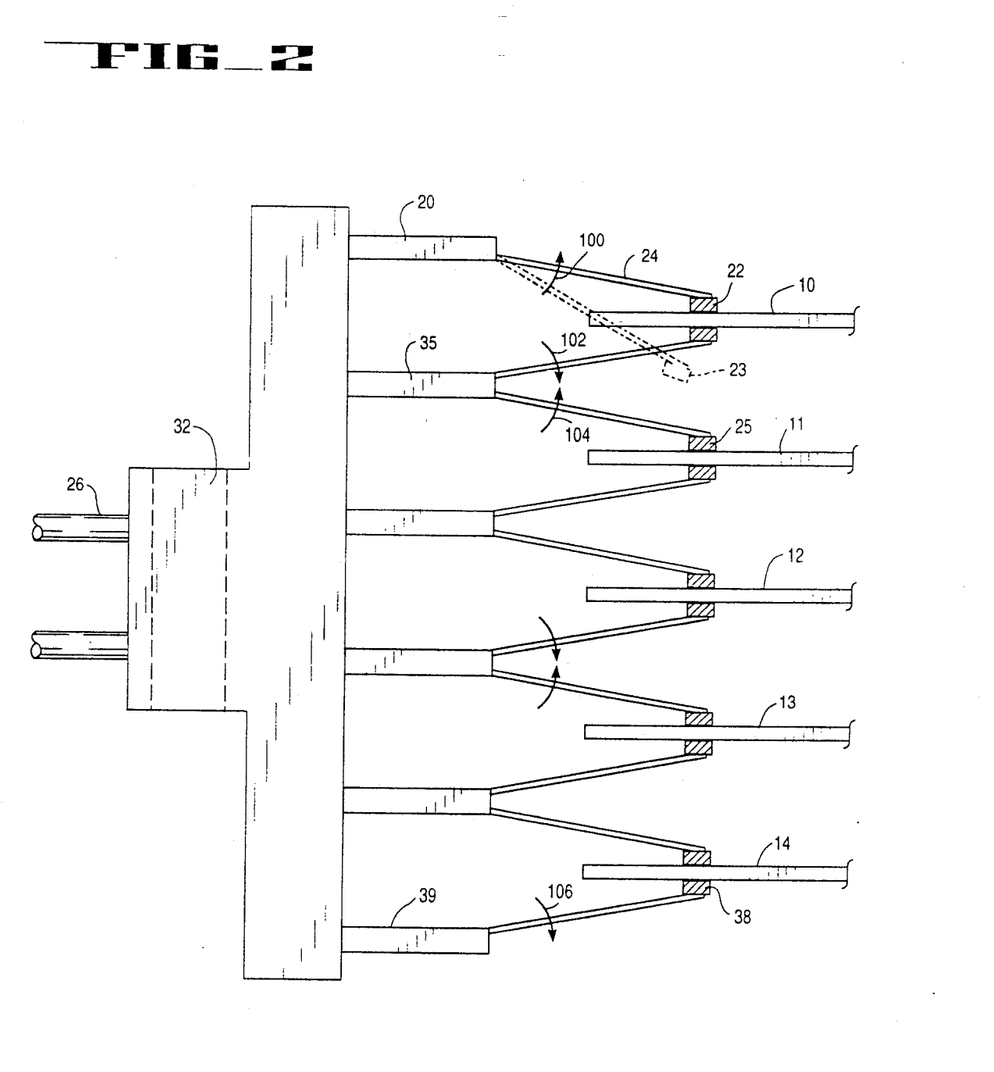
FIG. 2 is a side view of the actuator assembly and platter arrangement.

FIG. 2 illustrates a side view of the disk system as described above while the disk drive is at rest. In FIG. 2 there are five platters shown, the top platter 10, mid platters 11, 12, and 13, and another platter 14. Each platter has two surfaces. There are six actuator arms, two outer arms 20 and 39 and four inner actuator arms. FIG. 2 illustrates ten read/write heads, one for each platter surface. The inner actuator arms have two associated read/write heads while the outer actuator arms have only one associated read/write head. Read/write head 22 is associated with the surface of platter 10. Side view of pivot section 32 and actuator section 26 are also illustrated. The read/write head 22 is attached to a thin head assembly 24 which is connected to an actuator arm 20. The read/write head 22 is pressed against the surface of platter 10 when the platters are not spinning. Head assembly 24 exerts pressure on head 22 pushing it into platter 10. If platter 10 was removed from the illustration, read/write head 22 would move to position 23 represented by the dashed lines. With reference to the actuator assembly, position 23 is approximately 10 to 15 mils inward from its original position. When the read/write head 22 and head assembly 24 are attached to the actuator arm 20, it is positioned into position 23. Because the head assembly 24 is thin, it can be displaced outward ("pushed"), like a spring, from its extended rest position 23 into the original described position which rests on platter 10. In this position the head assembly will act as a spring and exert a force on the surface of platter 10 through the read/write head 22. The force exerted by read/write head 22 onto the platter surface is called the preload value.

Since the assembly structure is static, the read/write head 22 also exerts an outward moment force 100 on the tip of the actuator arm 20. This moment force 100 may displace actuator arm 20. The same is true for read/write head 21 associated with adjacent actuator arm 35. The read/write head 21 is positioned such that it will exert a preload force upward on the bottom surface of platter 10. If platter 10 were removed, the read/write head 21 would extend upward to its rest state. Read/write head 21 also exerts a downward moment force 102, through the associated head assembly, on actuator arm 35. Like read/write head 22, head 25 exerts a downward preload force on platter 11 but it exerts an a counter upward moment force 104, through the associated head assembly, to actuator arm 35. It can be seen that actuator arm 35 receives an upward moment force 104 associated with read/write head 25 and a balancing equal but opposite moment force 102 downward associated with read/write head 21. The two equal but opposite moment forces 102 104 cancel each other and the resultant moment force associated with actuator arm 35 is zero. Therefore, actuator arm 35 is not imbalanced and therefore does not move.

Referring still to FIG. 2, actuator arms 20 and 39 are the outer actuator arms. Actuator arm 20 receives an upward moment force 100 from read/write head 22 but no balancing downward moment force because there is no corresponding read/write head assembly above platter 10. Actuator arm 20 is therefore imbalanced. This imbalance tends to move ("bend") actuator arm 20 upward, away from its alignment position depending on the thickness of the actuator arm. If the thickness of the actuator arm is 25 mils, the displacement is 2 mils. Likewise, outer actuator arm 39 receives a downward moment force 106 associated with read/write head 38, but actuator arm 39 does not receive a balancing upward moment force because there are no corresponding read/write head assembly beneath platter 14. The imbalanced moment 106 tends to bend outer actuator arm 30 downward out of alignment depending on the thickness of the actuator arm.

At 25 mil thickness, the outer actuator arms will move out of alignment as discussed above. When the disk drive platters begin to spin during disk drive operation, the preload pressure value of the associated read/write heads of the outer actuator arms will decrease as a result of the alignment change. The associated read/write heads will fly higher off of the surfaces of platter 10 and 14 when the preload value decreases. This flying height change will cause data errors as the data is stored and calibrated to be accessed at a particular read/write head flying height which corresponds to the predetermined preload value. It is appreciated that the inner actuator arms do not experience this problem because they each have a balanced moment force and therefore are not moved out of alignment. Therefore the preload force associated with read/write heads of inner actuator arms remains constant.

In prior art systems, this imbalance of moment forces which act on the outer actuator arms 20 and 39 does not present a problem because most prior art systems have actuator arms of approximately 35 mils thickness. At this thickness the actuator arms are approximately three times as stiff as the thin actuator arms used within the present invention. The rigidity of an actuator arm is proportional to the cube of the ratio between the thickness of the arm. If the ratio of thickness of the present invention actuator arm and prior art actuator arms is 1.4 or 35/25, then the cube of this ratio is 2.7. Therefore, at 35 mils thickness the actuator arms are almost three times more rigid than the 25 mil thickness actuator arms of the preferred embodiment of the present invention, assuming both arms are composed of the same or similar material. At 35 mils thickness, the outer actuator arms will not become displaced by the imbalanced moment force and therefore the preload force of the associated read/write head remains constant.

The Preferred Embodiment of the Present Invention Specially Aligns the Outer Actuator Arms:

The present invention offers a means and method to compensate for the imbalance moment forces upon the outer actuator arms in order to maintain the preload force associated with the read/write heads of the outer actuator arms. The preferred embodiment of the present invention displaces the positions of the outer arms inward so that the outer actuator arms become aligned straight (similar alignment to the inner actuator arms) when the disk drive is in operation and the platters are spinning. In order to accomplish this positioning, the preferred embodiment of the present invention bends or displaces the outer actuator arms inward by the anticipated amount of displacement caused by the imbalanced moment forces. In this displacement position, the imbalance force of the disk drive in operation will move the actuator arms outward and they will become aligned straight similar to the alignment of the inner actuator arms which have a balanced moment. When the outer actuator arms are then aligned straight, the preload force of the associated read/write head is then maintained.

Specifically, the preload value of the disk drive actuator assembly of the present invention is set at 3.5 grams. That is, when the platters of the present invention are at rest, each read/write head associated with the internal actuator arms exerts a pressure of 3.5 grams onto the surface of the associated platter. The thickness of the actuator arms of the present invention is 25 mils (0.025 inches). The preload value for each read/write head varies depending on the variance of alignment of its associated actuator arm by the equation:

Preload Change (grms) = −85 (grms/inch)*variance (inches), where variance is the movement or displacement of the outer actuator arms caused by the unbalanced moment force, the value 85 is a constant multiplier. Preload change is the difference in preload force per unit of variance of the actuator arm. Therefore, as the outward variance of the actuator arm increases, the preload value decreases. Also, as the inward variance of the actuator arm decreases, the preload value will increase. That is to say, as the outer actuator arm is bent inward towards the platter, the preload value increases and as the actuator arm is bent away from the platter outward, the preload value will decrease. Therefore, for every 2 mils that the tip of an actuator arm is moved outward from its alignment position, the preload pressure decreases by approximately 0.2 grams or 85 * 0.002. Because the preload value effects the flying height of the read/write heads the preload value must remain at or very close to 3.5 grams. As the preload value decreases, the read/write head will fly higher above the platter surface. A 0.2 gram decrease in the preload force will allow the read/write head to fly much too high above the surface of the platter for the disk drive to operate properly. Therefore, if the tips of the outer actuator heads of the present invention bend more than 2 mils outward from their aligned position the system fails. For instance, a 0.2 gram decrease in the preload force will approximately translate to 0.2 microinches of arm displacement. As a ratio of the nominal flying height of 3.0 microinches this will be 6 to 7 percent, which is a significant variation.

Figure 3:
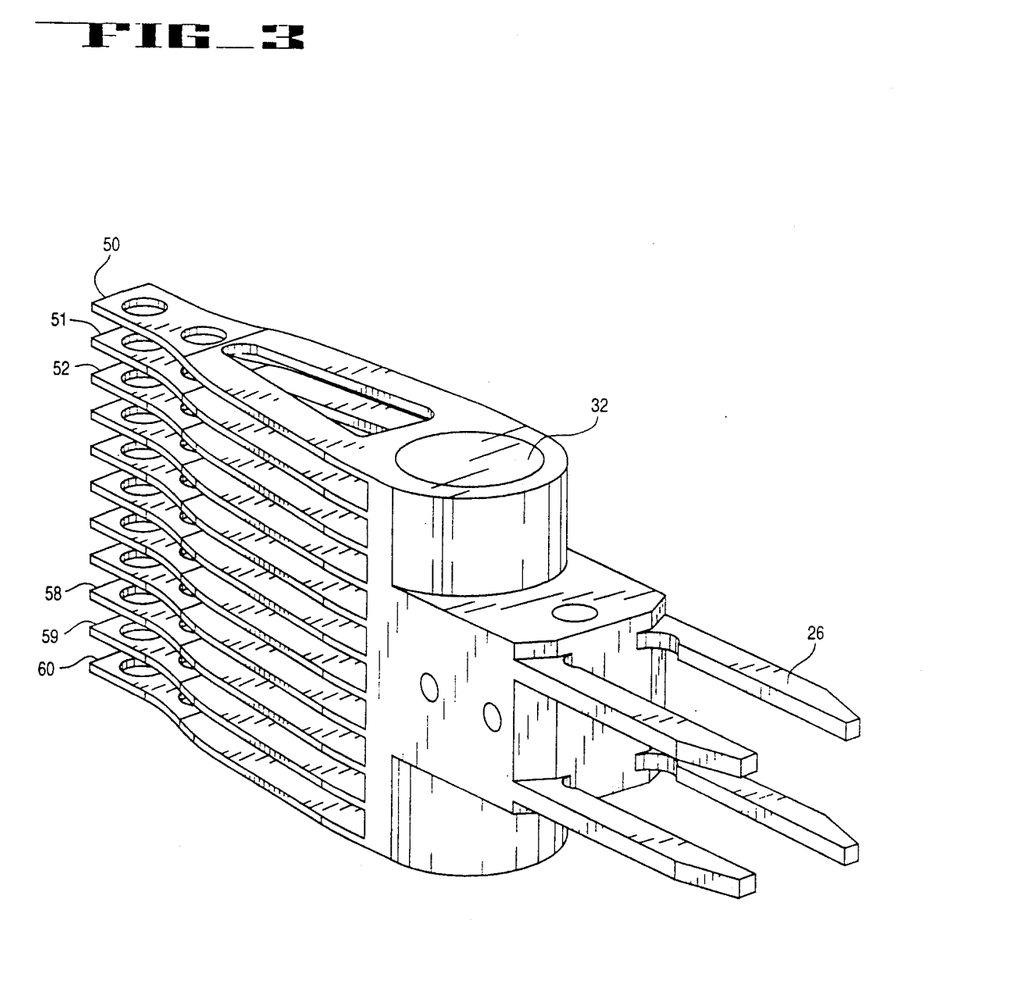
FIG. 3 illustrates the top and side view of the actuator assembly of the present invention.

FIG. 3 illustrates a top and side dimensional view of the actuator assembly structure of the preferred embodiment of the present invention. The present invention actuator assembly is designed for 10 platters and therefore has eleven actuator arms from outer arm 50 to outer arm 60. There are two outer arms and nine inner arms. There are two heads associated with each of the nine inner actuator arm and one read/write head associated with each of the two outer actuator arms 50 and 60. Therefore, there are twenty read/write heads of the present invention. The outer actuator arms 50 and 60 are shown without the read/write heads and associated head assemblies for clarity. Each actuator arm is attached to the central section 32 which is called the actuator assembly. The portion of each actuator arm attached to the actuator assembly is approximately 25 mils thick. The actuator arm tapers to 20 mils thickness at the end points of the actuator arms as shown in FIG. 3. The tip of the actuator arms are approximately 0.2 inches wide. The width of the actuator arm assembly is approximately 0.6 inches at the point 32. The length of the actuator arm is approximately 2.4 inches from the back of section 26 to the tip of the actuator arms. The present invention actuator assembly structure stands approximately 1.0 inch tall. It is appreciated that these dimensions are presented herein for a detailed discussion, however the spirit and substance of the present invention will advantageously operate within a number of various assembly structures with different dimensions. The present invention should be not construed as limited by these dimensions.

Referring still to FIG. 3, according to the advantageous structure of the present invention, the outer actuator arms 50 and 60 are both aligned inward to compensate for the imbalance of read/write head moment forces which act on them. From this vantage point of FIG. 3, the inward displacement of the outer actuator heads is very subtle as the actuator arms are approximately 1.4 inches long and the inward compensation amount is on the order of 1.0 to 2.0 mils. For example, actuator arm 50 is slightly bent inward toward actuator arm 51 by 1.0 to 2.0 mils and actuator arm 60 is similarly slightly bent upward toward actuator arm 59 by 1.0 to 2.0 mils. The other nine of the inner actuator arms not on the outer ends remain aligned straight and parallel to each other. Pivot point 32 as well as actuator section 26 are shown in FIG. 3. The actuator section 26 is coupled to a magnetic actuator which supplies the movement for the actuator assembly. These magnetic actuators are well known and do not bear on the present invention and are therefore not described in detail.

As discussed, the actuator arms of the present invention are very thin, at only 25 mils thickness at the center and 20 mil thickness near the tip. At this thickness, the imbalanced moment forces created by the associated read/write heads (while flying) are enough to move the outer actuator arms outward by about 2 mils. As discussed above, each of the inner actuator arms (i.e., 51, 52, 58, 59) have two read/write heads attached, one on either side of the actuator arm. Thus, one read/write head pushes on the inner actuator arm in one direction while the other read/write head pushes on the same actuator arm in the opposite direction, thus equally balancing the actuator arm. Therefore, the inner actuator arms remain aligned in their original positions. However, outer actuator arm 60 is pushed outward by its associated flying read/write head and outer actuator arm 50 is pushed outward by its associated read/write head. Since the actuator arms are bent inward initially, they become straightened when the imbalanced force is applied. Since the preload value depending on the alignment of the actuator arms, the preload is advantageously maintained in the present invention.

Figure 4:
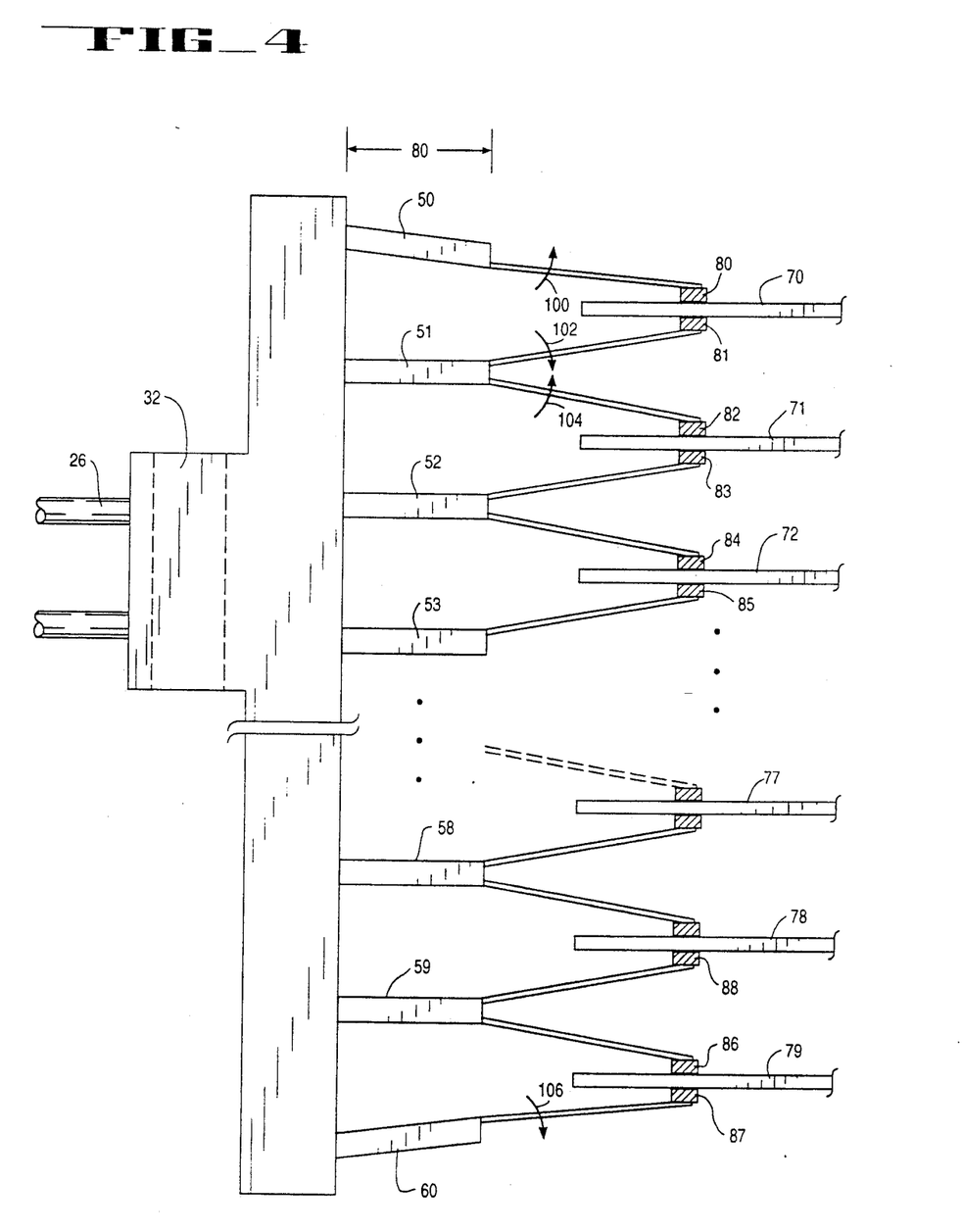
FIG. 4 is a side view of the present invention actuator assembly while the disk drive system is at rest.

FIG. 4 illustrates a diagrammatic side view of the outer actuator arms of the present invention in more detail with respect to the functional aspects of the present invention. The actuator assembly shown in FIG. 4 includes the read/write heads and associated assemblies. FIG. 4 illustrates the present invention when the disk drive platters are still and excludes some of the inner actuator arms of the present invention for clarity. This diagram is not shown to scale in order to better illustrate and emphasize the special alignment of the outer actuator arms of the present invention. Outer actuator arms 50 and 60 are shown in their bent inward position. With respect to their original (straight) position, the tip of actuator arm 50 is bent inward approximately 1 to 2 mils and the tip of actuator arm 60 is bent inward approximately 1 to 2 mils. Since the length 80 of the actuator arm is approximately 1.4 inches, the inward displacement is a small ratio of the total length. The amount that the outer actuator arms are bent inward is approximately 0.08 degrees with reference to the assembly structure which holds all of the actuator arms. This value can be obtained by taking the inverse sine of the value 2 mils divided by 1.4 inches which yields 0.08 degrees. Each actuator arm of the present invention is approximately 25 mils thick. Each platter 70–79 is approximately 33 mils thick. The distance between adjacent actuator arms is approximately 97 mils. According to these dimensions, it can be seen that the outer actuator arms are bent inward toward the next adjacent actuator arm to about 1/50th of their original separation. It is appreciated that this seemingly small adjustment has a large impact on the disk drive reliability and performance as will be discussed to follow.

FIG. 4 illustrates the imbalanced moment force 100 exerted on actuator arm 50 and the imbalanced moment force 106 exerted on actuator arm 60. Moment force 100 will bend actuator arm 50 outward and likewise moment force 106 will bend actuator arm 60 downward.

It should be noted that the read/write head 80 of FIG. 4 exerts a larger preload force than 3.5 grams upon platter 70 when the disk drive system is at rest because actuator arm 50 is bent inward by 1.0 to 2.0 mils. Likewise, read/write head 87 exerts a larger preload force than 3.5 grams upon platter 79 because actuator arm 60 is bent inward. This total additional preload force is approximately 3.7 grams because the outer actuator arms 50 and 60 have been bent inward approximately 2 mils and a 2 mil variance of the outer actuator arms increases the preload force by 0.2 grams as already discussed previously. Therefore 3.5 grams with an additional 0.2 grams yields a total of 3.7 grams of compensated preload force for read/write head 80 and 87. This additional preload force is the compensation force that is advantageously added by the preferred embodiment of the present invention in order to counterbalance the imbalance moment forces produced by the read/write head on the outer actuator arms.

Figure 5:
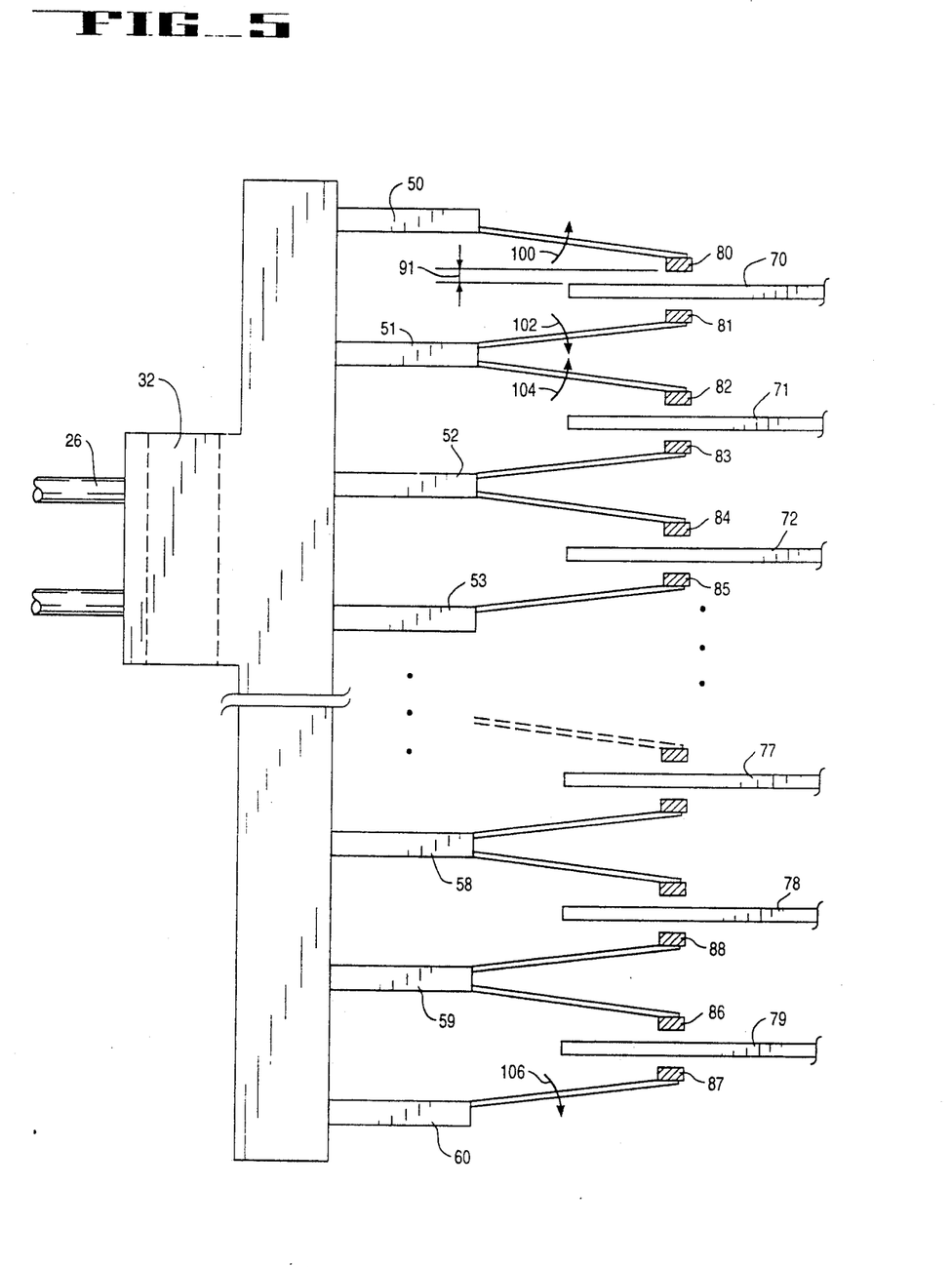
FIG. 5 is a side view of the present invention actuator assembly while the platters are spinning.

Refer now to FIG. 5 which illustrates the structure of the preferred embodiment of the present invention while the disk drive platters are spinning. As can be seen by FIG. 5, the read/write heads of the present invention are at their flying height 91 which is approximately 3 microinches above the spinning platters. An air bearing force is created by the platters spinning which acts to raise the read/write heads up from the platter surface. The preload charge is determined based on the is air bearing force in order to maintain the read/write heads at the desired 3 microinch flying height. Also, note that the outer actuator arm 50 and 61 have been displaced by the imbalance force of the associated read/write heads by 1.0 to 2.0 mils into a straight position. At this straight position, there is a proper preload force associated with each of the read/write heads 80 and 87. Because the outer actuator arms 50 and 60 have displaced, the additional preload force of 3.7 grams associated with each has been reduced to the nominal preload force of 3.5 grams.

Specifically, during disk drive operation, when platters 70 to 79 are spinning, outer actuator arm 50 receives an exerted moment force 100 outward from read/write head 80 and moves 1.0 to 2.0 mils upward; the preload force of read/write head 80 decreases to 3.5 grams and flies 3 microinches from the surface of platter 70. Inner actuator arm 51 receives two balanced forces, one moment 102 from read/write head 81 and one moment 104 from read/write head 82. For the inner actuator arm 51, the resultant moment force is therefore 0 and the preload force of read/write heads 81 and 82 remains at 3.5 grams and read/write heads 81 and 82 fly at 3 microinches from their associated platter surfaces. Likewise, inner actuator arm 59 receives two balanced forces, one moment from read/write head 86 and one equal but opposite moment from read/write head 88. Therefore, the resultant moment force on inner actuator arm 59 is also 0. Outer actuator arm 60 receives one imbalanced external moment force 106 outward from read/write head 87. The preload force of read/write head 87 decreases from 3.7 to 3.5 and therefore head 87 will fly 3 microinches from the surface of platter 79.

At 25 mils thickness, the imbalanced moment forces 100 and 106 exerted by the read/write heads 80, and 87 when flying will push the outer actuator arms outward. The present invention has specially designed the amount of initial inward bend of the outer actuator arms 50 and 60 to correspond to the amount of displacement outward that these actuator arms can expect to experience during operation from the respective imbalance moment forces 100 and 106. Because each of the outer actuator arms has been bent inward, it will resist outward displacement to a certain degree. Once the outward force moment exerted by the read/write head equals the inward moment forces caused by the bend junction, the outer actuator arms will displace no further. According to the above discussion, the present invention has calibrated this point to be the point where the outer actuator arms become advantageously aligned straight. Therefore, the resistance force created by bending the actuator arm inward coupled with the additional preload force associated with this inward alignment acts as a inward compensation force to balance the outward forces 100 and 106 generated by the read/write heads 80 and 87.

Therefore, the outer actuator arms 50, 60 of the present invention have an internal compensation force for the outward forces of the associated read/write heads 80 and 87 respectively. The increased preload value associated with each of the outer actuator arms when the platters are at rest is 3.7 grams. When the outer actuator arms are displaced 2 mils outward to their straight position when the disk drive system is in operation. This preload value is decreased to 3.5 grams which is the desired loading for the present invention. Therefore, it can be seen by the illustration in FIG. 5 that when the disk drive platters are spinning, all of the read/write heads have the same, uniform, preload value of 3.5 grams and therefore the same flying height of 3 microinches from the platter surface.

Using the advantageously bent outer actuator arms, the outer read/write heads of the present invention maintain the preload force of 3.5 grams during operation of the disk drive. Since the outer actuator arms of the present invention have internal compensation for the imbalance force, they can maintain the desired preload force of 3.5 grams. Therefore, the preload force on the read/write heads 80 and 87 is not decreased and equals the loading the inner arms. Since the preload force is not decreased the read/write heads 80 and 87 associated with the outer actuator arms maintain a constant flying height above their associated platter surface.

Effect of the Preload Force on the Flying Height

The height that the read/write heads fly above the platters during disk drive operation of the present invention is very low, at approximately 3.0 microinches. For each decrease of 0.2 grams of preload value, the flying height increases by approximately 0.2 micro inches. When the flying height increases to approximately 3.3 microinches then read/write function of the disk drive begins to fail because the read/write heads are too far out of alignment. It is appreciated that if the outer actuator arms are allowed to remain in a position that does not maintain the preload force on the read/write head then the outer read/write heads 80 and 7 will fly at a height of 3.2 microinches and therefore the disk drive system is very close to failure. Taking in considerations of manufacturing yield and reliability it is clear that this excessive flying height is not desirable. In this fashion, a seemingly small variance (0.08 degrees) in the outer actuator arms produces a substantial effect on the flying height of the read/write heads in term of reliability and manufacturing yield. Therefore, the present invention offers a means to correct for this 0.2 microinch increase in flying height by specially aligning the outer actuator arms of the actuator assembly.

Reduction of Actuator Arm Fatigue:

It is also appreciated that because the present invention offers an internally balanced outer actuator arm by compensation forces, the outer actuator arms remain aligned more reliably than if the outer actuator arms where not bent inward. The outer actuator arms are therefore less susceptible to fatigue and movement form alignment over time as a result of the imbalanced moment forces 100 and 106. Therefore, in addition to providing a method and apparatus for maintain a preload force on read/write heads 80 and 87, the present invention also provides an advantageous method and apparatus to reduce fatigue and misalignment, that occurs over time, to the outer actuator arms 50 and 60.

The preferred embodiment of the present invention, an apparatus and method for preload force compensation of otherwise imbalanced outer actuator arms of an actuator assembly to maintain uniform read/write flying height, is thus described. While the present invention has been described in one particular embodiment, it should be appreciated that the present invention should not be construed as limited by such embodiment, but rather construed according to the below claims.

What is claimed is:

1. An apparatus for maintaining uniform preload force within a disk drive, said apparatus comprising:
    actuator assembly means for providing coupling locations;
    a plurality of actuator arms coupled to said actuator assembly means, said plurality of actuator arms for supporting and positioning a plurality of read/write head assemblies;
    said plurality of read/write head assemblies coupled to said plurality of actuator arms and said plurality of read/write head assemblies aligned to contact surfaces of a plurality of stacked and evenly spaced platters, said plurality of read/write head assemblies for exerting said preload force on said surfaces of said plurality of stacked and evenly spaced platters; and
    outer actuator arms of said plurality of actuator arms located on outer ends of said plurality of actuator arms, said outer actuator arms displaced inward toward adjacent actuator arms, said outer actuator arms for maintaining a uniform preload force across attached read/write head assemblies to compensate for an imbalanced moment force applied to said outer actuator arms.

2. An apparatus for maintaining uniform preload force within a disk drive as described in claim 1 further comprising inner actuator arms of said plurality of actuator arms and wherein two of said plurality of read/write head assemblies are coupled to each of said inner actuator arms and one of said plurality of read/write head assemblies is coupled to each of said outer actuator arms.

3. An apparatus for maintaining uniform preload force within a disk drive as described in claim 2 wherein each read/write head assembly of said plurality of read/write head assemblies comprises a read/write head.

4. An apparatus for maintaining uniform preload force within a disk drive as described in claim 3 wherein said preload force associated with said read/write head assemblies determines desired flying height of said read/write heads above said surfaces of said stacked and evenly spaced platters.

5. An apparatus for maintaining uniform preload force within a disk drive as described in claim 2 wherein said imbalanced moment force is exerted through said read/write head assemblies and wherein said outer actuator arms are displaced inward to such degree so that said imbalanced moment force displaces said outer actuator arms outward parallel to said inner actuator arms.

6. An apparatus for maintaining uniform preload force within a disk drive as described in claim 5 wherein read/write assemblies of said plurality of read/write assemblies associated with said outer actuator arms have a first preload value and wherein read/write assemblies of said plurality of read/write assemblies associated with said inner actuator arms have a second preload value.

7. An apparatus for maintaining uniform preload force within a disk drive as described in claim 6
    wherein said first preload value is determined by alignment of said outer actuator arms and is larger than said second preload value when said outer actuator arms are aligned inward toward said inner actuator arms, said second preload value determined by alignment of said inner actuator arms and wherein said first preload value is equal to said second preload value when said outer actuator arms are aligned parallel to said inner actuator arms.

8. An apparatus for maintaining uniform preload force within a disk drive as described in claim 7 wherein said first preload value is approximately 3.7 grams when said outer actuator arms are aligned inward toward said inner actuator arms and said first preload value is approximately 3.5 grams when said outer actuator arms are aligned parallel to said inner actuator arms.

9. An apparatus for maintaining uniform preload force within a disk drive as described in claim 5 wherein each actuator arm of said plurality of actuator arms is approximately 20 to 25 mils thick and are each approximately 1 inch long.

10. An apparatus for maintaining uniform preload force within a disk drive as described in claim 9 wherein said outer actuator arms are displaced inward toward said inner actuator arms between 1.0 to 2.0 mils.

11. An apparatus for maintaining uniform preload force within a disk drive as described in claim 5 wherein said outer actuator arms are displaced inward toward said inner actuator arms less than 0.10 degrees with respect to said actuator assembly means.

12. An apparatus for compensating for imbalanced moment forces of an actuator assembly of a disk drive to maintain preload forces, said disk drive having platters, said apparatus comprising:
    an actuator assembly means for providing coupling locations;
    a plurality of read/write head assemblies coupled against said platters, each of said read/write head assemblies comprising a read/write head;
    a plurality of inner actuator arms coupled to said actuator assembly means and each of said plurality of inner actuator arms also coupled to two of said plurality of read/write head assemblies, said inner actuator arms each displaced parallel to one another; and
    outer actuator arms coupled to said actuator assembly means and each of said outer actuator arms coupled to an associated one of said plurality of read/write head assemblies, said outer actuator arms each displaced inward toward an adjacent inner actuator arm, said outer actuator arms for maintaining a preload force for each associated one of said plurality of read/write head assemblies.

13. An apparatus for compensating for imbalanced moment forces of an actuator assembly as described in claim 12 wherein said outer actuator arms exert a first preload force against said platters, wherein said inner actuator arms exert a second preload force against said platters, and wherein said associated one of said plurality of read/write head assemblies exerts an imbalanced moment upon an associated outer actuator arm to displace said associated outer actuator arm parallel to said inner actuator arms.

14. An apparatus for compensating for imbalanced moment forces of an actuator assembly as described in claim 13 wherein said first preload force is greater than said second preload force when said outer actuator arms are aligned inward toward said inner actuator arms and wherein said first preload force reduced to said second preload force when said outer actuator arm is aligned parallel to said inner actuator arms.

15. An apparatus for compensating for imbalanced moment forces of an actuator assembly as described in claim 14 wherein said first preload force is on the order of 3.7 grams and said second preload force is on the order of 3.5 grams when said outer actuator arms are aligned inward.

16. An apparatus for compensating for imbalanced moment forces of an actuator assembly as described in claim 14 wherein second preload force determines desired flying height of said read/write heads.

17. An apparatus for compensating for imbalanced moment forces of an actuator assembly as described in claim 16 wherein said desired flying height of said read/write heads is 3 microinches.

18. An apparatus for compensating for imbalanced moment forces of an actuator assembly as described in claim 14 wherein said outer actuator arms are displaced inward by 1.0 to 2.0 mils.

19. An apparatus for compensating for imbalanced moment forces of an actuator assembly as described in claim 13 wherein said first preload force is exerted against said platters by said one of said plurality of read/write head assemblies associated with each of said outer actuator arms and said second preload force is exerted against said platters by said two of said plurality of read/write head assemblies associated with each of said inner actuator arms.

20. In an actuator assembly structure having inner actuator arms; read/write head assemblies wherein two of said read/write head assemblies are coupled to each of said inner actuator arms; and platters aligned in predetermined positions for coupling with said read/write head assemblies, wherein said two of said read/write head assemblies coupled to said inner actuator arms exert a first preload force on said platters, an improvement for compensating for an imbalanced moment within said actuator assembly structure, wherein said improvement comprising:

outer actuator arms for supporting said read/write head assemblies, each of said outer actuator arms coupled to an associated one of said read/write head assemblies, said outer actuator arms aligned inward toward said inner actuator arms and said outer actuator arms for compensating for said imbalanced moment by causing said associated one of said read/write head assemblies to exert a larger preload force on said platters than said first preload force.

21. An improvement for compensating an imbalanced moment within said assembly structure as described in claim 20 wherein said associated one of said read/write head assemblies exerts said imbalanced moment force on an associated outer actuator arm, said imbalanced force aligning said associated outer actuator arm parallel with said inner actuator arms and causing said associated one of said read/write head assemblies to exert said first preload force on said platters.

22. An improvement for compensating an imbalanced moment within said assembly structure as described in claim 21 wherein said imbalanced moment force is applied to said associated one of said read/write head assemblies.

23. An improvement for compensating an imbalanced moment within said assembly structure as described in claim 21 wherein said read/write assemblies comprise read/write heads and wherein said first preload force determines a correct flying height of said read/write heads.

24. An improvement for compensating an imbalanced moment within said assembly structure as described in claim 21 wherein said outer actuator arms are aligned inward toward said inner actuator arms by a range from 1.0 to 2.0 mils.

25. An improvement for compensating an imbalanced moment within said assembly structure as described in claim 21 wherein said inner actuator arms and said outer actuator arms are between 20 and 25 mils thick.

26. An improvement for compensating an imbalanced moment within said assembly structure as described in claim 21 wherein said first preload force is on the order of 3.5 grams.

27. A method for compensating for an imbalanced moment force within an actuator assembly structure of a disk drive, wherein said disk drive contains platters, said actuator assembly having inner actuator arms and outer actuator arms coupled to said actuator assembly, said method comprising the steps of:

providing one read/write head assembly coupled to each of said outer actuator arms, said one read/write head assembly exerting a first preload force against an associated platter surface;

providing two read/write head assemblies coupled to each of said inner actuator arms, said two read/write assemblies individually exerting a second preload force against an associated platter surface;

increasing said first preload force such that said first preload force is larger than said second preload force by aligning said outer actuator arms inward toward said inner actuator arms; and causing said one read/write head assembly to exert said second preload force by applying said imbalanced moment force through said one read/write head assembly to an associated outer actuator arm of said outer actuator arms.

28. A method for compensating for an imbalanced moment force within an actuator assembly structure of a disk drive as described in claim 27 wherein step of applying said imbalanced moment force aligns said outer actuator arm parallel to said inner actuator arms causing said one read/write head assembly coupled to said associated outer actuator arm to exert said second preload force.

29. A method for compensating for an imbalanced moment force within an actuator assembly structure of a disk drive as described in claim 28 further comprising the step of providing platters associated with said outer actuator arms and wherein said first and said second preload forces are exerted upon said platters.

30. A method for compensating for an imbalanced moment force within an actuator assembly structure of a disk drive as described in claim 28 wherein said second preload force determines desired flying height of a read/write head of said read/write head assembly above an associated platter surface.

31. A method for compensating for an imbalanced moment force within an actuator assembly structure of a disk drive as described in claim 30 wherein said desired flying height is 3 microinches.

32. A method for compensating for an imbalanced moment force within an actuator assembly structure of a disk drive as described in claim 28 wherein said inner actuator arms and said outer actuator arms are 20 to 25 mils thick.

33. A method for compensating for an imbalanced moment force within an actuator assembly structure of a disk drive as described in claim 28 wherein said outer actuator arms are aligned inward about 1.0 to 2.0 mils.

34. A method for compensating for an imbalanced moment force within an actuator assembly structure of a disk drive as described in claim 28 wherein said imbalanced moment is applied to said one read/write assembly.

35. An actuator assembly of a disk drive, said actuator assembly comprising:
   an actuator for positioning read/write heads across surfaces of media bearing platters;
   inner actuator arms coupled to said actuator, said inner actuator arms aligned parallel to one another, said inner actuator arms for individually supporting two read/write head assemblies;
   a first outer actuator arm coupled to said actuator on a location adjacent to said inner actuator arms said first outer actuator arm for supporting a single read/write head assembly; and
   wherein said first outer actuator arm is aligned inward toward an adjacent inner actuator arm to compensate for an imbalanced force exerted on said first outer actuator arm by said single read/write head assembly coupled to said first outer actuator arm.

36. The actuator assembly as described in claim 35 further comprising a second outer actuator arm coupled to said actuator on a location adjacent to said inner actuator arms, said second outer actuator arm for supporting a single read/write head assembly; and
   wherein said second outer actuator arm is bent inward toward an adjacent inner actuator arm to compensate for an imbalanced force exerted on said second outer actuator arm by said single read/write head assembly coupled to said second outer actuator arm.

37. The actuator assembly as described in claim 36 wherein said two read/write head assemblies supported by each inner actuator arms individually exert a first preload force against respective surfaces of said media bearing platters.

38. The actuator assembly as described in claim 37 wherein said single read/write head assembly supported by said first outer actuator arm contacts a first platter surface of said media bearing platters and exerts a second preload force against said first platter surface and wherein said second preload force is larger than said first preload force.

39. The actuator assembly as described in claim 35 further comprising means for rotating said media bearing platters and wherein said imbalanced force aligns said first outer actuator arm parallel to said inner actuator arms when said media bearing platters are rotated by said means for rotating.

* * * * *